Patented Dec. 10, 1940

2,224,811

UNITED STATES PATENT OFFICE 2,224,811

PROCESS FOR PREPARING 2-AMINO-4-CHLOROPYRIMIDINE

Jackson P. English, Stamford, Conn., assignor to American Cyanamid Company, New York, N. Y., a corporation of Maine No Drawing. Application August 6, 1940,
Serial No. 351,646

2 Claims. (Cl. 260—251)

This invention relates to an improved process of producing 2-amino-4-chloropyrimidine.

A class of chemotherapeutic compounds which shows very great promise in the treatment of infectious diseases comprises those recently produced by the condensation of sulfanilamide and amino pyrimidines to form the corresponding sulfanilamido pyrimidines. Some of the outstanding members of this class of compounds are those produced by the condensation of sulfanilamide with 2-amino-pyrimidines, 2-amino pyrimidine itself and the 2-amino substituted pyrimidines including 2-amino-5-chloropyrimidine.

The present invention provides an improved process for the production of 2-amino-4-chloropyrimidine which comprises the reaction of 2-amino-4-hydroxy-pyrimidine sulfate or isocytosine sulfate with phosphorous oxychloride. It has been proposed in the past to produce 2-amino-4-chloropyrimidine from isocytosine by reacting with phosphorus oxychloride. The prior proposed process, however, has not been entirely satisfactory in that the yields are only about 40% of the theory. When the process of the present invention is employed using isocytosine sulfate, the yields are very much larger being on the average of about 70 to 80% of the theory.

The present invention is not particularly concerned with the method by which the isocytosine sulfate is produced and it may be produced by any suitable process. An improved process for the preparation of isocytosine involving the condensation of guanidine salts with crude mixtures containing formyl acetic acid is described in the copending application of Roblin and English, Serial No. 331,754, filed April 26, 1940 which results in good yields of isocytosine that can readily be converted to the sulfate. An improved method of producing purified isocytosine sulfate is described in my copending application Serial No. 331,752, filed April 26, 1940, involving the treatment of crude isocytosine with dilute sulfuric acid and filtration which results in the removal of impurities in the filtrate leaving the purified isocytosine sulfate as a residue.

It is not necessary that a very pure isocytosine sulfate be used in carrying out the present invention as a crude isocytosine sulfate may be used to produce 2-amino-4-chloropyrimidine in a somewhat impure form which can then be purified. It is an advantage of the present invention, however, that when pure isocytosine sulfate is used, a very pure 2-amino-4-chloropyrimidine is produced which is in a purified form and suitable for condensation with acetylsulfanilyl chloride to produce a chemotherapeutic product.

The present invention is based on my discovery that the use of isocytosine sulfate in reactions with phosphorus oxychloride results in a smoother reaction, improved yields and a product of higher quality than is obtained when isocytosine is used as the reactant.

The invention will be described in greater detail in conjunction with the following specific examples which are illustrative of the present process for the production of 2-amino-4-chloropyrimidine but it is not limited to the details therein set forth. The parts are by weight except for liquids where the corresponding parts by volume are used.

Example 1

624 parts of isocytosine sulfate are suspended in 1900 parts of phosphorus oxychloride and the whole is refluxed gently for three and one-half hours. At the end of this period the reaction mixture is a clear, light-brown liquid. 930 parts of phosphorus oxychloride are distilled off in vacuum and the semi-viscous residue is poured with stirring into 3500 parts of ice and 1000 parts of water. 10 parts of decolorizing charcoal and a few drops of an anti-foaming agent are added to the solution and the whole is stirred for two hours.

The mixture is filtered and neutralized at room temperature by the addition of about 2850 parts of concentrated aqueous ammonia (28%). The mother liquor is decanted from the nearly colorless precipitate and this is washed several times with water by decantation.

The 2-amino-4-chloropyrimidine was collected by filtration, pressed out well and dried at 60° C. The yield was 536 parts.

Example 2

267 parts of crude isocytosine produced by the condensation of guanidine with formyl acetic acid and having a melting point with decomposition at 253–255° C. are stirred with about 500 parts of 10% sulfuric acid for about 45 minutes/at room temperature. The mixture is then filtered, the solid is washed well with water and dried at about 60° C. The yield is 242 parts of light-colored isocytosine sulfate melting with decomposition at 275–277° C. which is sufficiently pure for use as an intermediate in the production of 2-amino pyrimidine. A sample of the isocytosine sulfate produced was reacted with phosphorus oxychloride as described in Example 1. The yield of 2-amino-4-chloropyrimidine was about 70%.

What I claim is:

1. A method of producing 2-amino-4-chloropyrimidine which comprises reacting phosphorus oxychloride with isocytosine sulfate.

2. A method of producing 2-amino-4-chloropyrimidine which comprises refluxing a mixture of isocytosine sulfate and phosphorus oxychloride, separating the reaction product from the phosphorus oxychloride, dissolving the reaction product in water, filtering and neutralizing the filtrate with a base to precipitate the 2-amino-4-chloropyrimidine.

JACKSON P. ENGLISH.